US012596800B2

(12) United States Patent
Yaron et al.

(10) Patent No.: US 12,596,800 B2
(45) Date of Patent: *Apr. 7, 2026

(54) TECHNIQUES FOR CROSS-SOURCE ALERT PRIORITIZATION AND REMEDIATION

(71) Applicant: Dazz, Inc., San Francisco, CA (US)

(72) Inventors: Eshel Yaron, Amsterdam (NL); Barak Bercovitz, Even-Yehuda (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,112

(22) Filed: Nov. 27, 2024

(65) Prior Publication Data

US 2025/0173434 A1     May 29, 2025

Related U.S. Application Data

(60) Provisional application No. 63/603,949, filed on Nov. 29, 2023.

(51) Int. Cl.
*G06F 21/55* (2013.01)
*G06N 20/00* (2019.01)
(52) U.S. Cl.
CPC ........... *G06F 21/554* (2013.01); *G06N 20/00* (2019.01); *G06F 2221/034* (2013.01)
(58) Field of Classification Search
CPC .. G06F 21/554; G06F 2221/034; G06N 20/00
USPC ......................................................... 726/23
See application file for complete search history.

(56) References Cited

U.S. PATENT DOCUMENTS

| | | | |
|---|---|---|---|
| 10,503,347 B2 | 12/2019 | Humayun et al. | |
| 10,846,308 B2 | 11/2020 | Miller et al. | |
| 10,965,706 B2 | 3/2021 | Harris et al. | |
| 11,546,359 B2 | 1/2023 | Stockdale et al. | |
| 11,582,257 B2 | 2/2023 | Shua | |
| 11,714,698 B1 * | 8/2023 | Curtis ................... | G06F 18/214 714/48 |
| 12,181,956 B1 * | 12/2024 | Curtis ................... | G06F 18/214 |
| 2022/0318625 A1 | 10/2022 | O'toole et al. | |
| 2023/0127836 A1 * | 4/2023 | Batson ................. | G06F 16/906 726/1 |

(Continued)

OTHER PUBLICATIONS

International Search Report for PCT/IB2024/061956, dated Jan. 29, 2025. International Searching Authority, Israel Patent Office, Jerusalem, Israel.

(Continued)

*Primary Examiner* — Dereena T Cattungal
(74) *Attorney, Agent, or Firm* — M&B IP Analysts, LLC

(57) ABSTRACT

A system and method for alert prioritization. A method includes applying a prioritization machine learning model with respect to a plurality of second cybersecurity alerts from a plurality of alert sources. The prioritization machine learning model is trained based on a training set to prioritize cybersecurity alerts across the plurality of alert sources. The training set includes a plurality of first cybersecurity alerts from the plurality of alert sources and a plurality of corresponding training prioritizations for the plurality of first cybersecurity alerts. A priority is determined for the plurality of cybersecurity alerts based on outputs of the prioritization model. A plurality of remediation actions is performed based on the determined priority.

18 Claims, 6 Drawing Sheets

100A

(56)                   References Cited

U.S. PATENT DOCUMENTS

| | | | |
|---|---|---|---|
| 2023/0224311 A1* | 7/2023 | Meshi | H04L 41/0609 |
| | | | 726/22 |
| 2023/0336586 A1 | 10/2023 | Sopan | |
| 2023/0362184 A1* | 11/2023 | Gelman | H04L 63/1433 |
| 2024/0098114 A1* | 3/2024 | Withnell | H04L 63/1441 |
| 2024/0169068 A1* | 5/2024 | Tishbi | G06F 21/577 |
| 2024/0250979 A1* | 7/2024 | Ding | H04L 63/1433 |
| 2024/0370533 A1* | 11/2024 | Mehta | G06F 21/577 |
| 2025/0131084 A1* | 4/2025 | Mo | G06F 21/577 |

OTHER PUBLICATIONS

Written Opinion of the Searching Authority for PCT/IB2024/
061956, dated Jan. 29, 2025. International Searching Authority,
Israel Patent Office, Jerusalem, Israel.

* cited by examiner

S350

Start

S410

Identify alerts to be prioritized

S420

Identify first set of clustering features

S430

Cluster alerts

S440

Select representative alerts from clusters

S450

Identify second set of grouping features

S460

Present groupings

S470

Obtain prioritization inputs

End

TECHNIQUES FOR CROSS-SOURCE ALERT PRIORITIZATION AND REMEDIATION

CROSS-REFERENCE TO RELATED APPLICATIONS

This application claims the benefit of U.S. Provisional Patent Application No. 63/603,949 filed on Nov. 29, 2023, the contents of which are hereby incorporated by reference.

TECHNICAL FIELD

The present disclosure relates generally to cybersecurity alert prioritization, and more specifically to prioritizing alerts generated across cybersecurity tools.

BACKGROUND

Cybersecurity in modern computing environments, and in particular cloud computing environments, often relies on many different cybersecurity tools for alerting on different potential cyber threats. As more and more specialized tools are developed, organizations become increasingly likely to use multiple different tools in order to manage security in their environments.

It would therefore be advantageous to provide a solution that would aid in managing alerts across different sources such as different cybersecurity tools.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for alert prioritization. The method comprises: applying a prioritization machine learning model with respect to a plurality of second cybersecurity alerts from a plurality of alert sources, wherein the prioritization machine learning model is trained based on a training set to prioritize cybersecurity alerts across the plurality of alert sources, wherein the training set includes a plurality of first cybersecurity alerts from the plurality of alert sources and a plurality of corresponding training prioritizations for the plurality of first cybersecurity alerts; determining a priority for the plurality of cybersecurity alerts based on outputs of the prioritization model; and performing a plurality of remediation actions based on the determined priority.

Certain embodiments disclosed herein also include a non-transitory computer readable medium having stored thereon causing a processing circuitry to execute a process, the process comprising: applying a prioritization machine learning model with respect to a plurality of second cybersecurity alerts from a plurality of alert sources, wherein the prioritization machine learning model is trained based on a training set to prioritize cybersecurity alerts across the plurality of alert sources, wherein the training set includes a plurality of first cybersecurity alerts from the plurality of alert sources and a plurality of corresponding training prioritizations for the plurality of first cybersecurity alerts; determining a priority for the plurality of cybersecurity alerts based on outputs of the prioritization model; and performing a plurality of remediation actions based on the determined priority.

Certain embodiments disclosed herein also include a system for alert prioritization. The system comprises: a processing circuitry; and a memory, the memory containing instructions that, when executed by the processing circuitry, configure the system to: apply a prioritization machine learning model with respect to a plurality of second cybersecurity alerts from a plurality of alert sources, wherein the prioritization machine learning model is trained based on a training set to prioritize cybersecurity alerts across the plurality of alert sources, wherein the training set includes a plurality of first cybersecurity alerts from the plurality of alert sources and a plurality of corresponding training prioritizations for the plurality of first cybersecurity alerts; determine a priority for the plurality of cybersecurity alerts based on outputs of the prioritization model; and perform a plurality of remediation actions based on the determined priority.

Certain embodiments disclosed herein include a method, non-transitory computer-readable medium, or system as noted above or below, wherein each training prioritization is defined relative to at least one other training prioritization of the plurality of training prioritizations from at least one different alert source of the plurality of alert sources.

Certain embodiments disclosed herein include a method, non-transitory computer-readable medium, or system as noted above or below, further including or being configured to perform the following step or steps: clustering the plurality of first cybersecurity alerts into a plurality of clusters; and selecting at least one first cybersecurity alert from each of the plurality of clusters, wherein the plurality of training prioritizations is defined further with respect to the at least one first cybersecurity alert selected from each of the plurality of clusters.

Certain embodiments disclosed herein include a method, non-transitory computer-readable medium, or system as noted above or below, further including or being configured to perform the following step or steps: determining a plurality of groupings based on the plurality of clusters; and sending the plurality of groupings to a device, wherein the training prioritization data is created based on user inputs received from the device in response to the presenting of the plurality of groupings.

Certain embodiments disclosed herein include a method, non-transitory computer-readable medium, or system as noted above or below, wherein each of the plurality of groupings includes a subset of the plurality of first cybersecurity alerts, wherein each first cybersecurity alert among the subset of each grouping belongs to a different cluster of the plurality of clusters than each other first cybersecurity alert among the subset of the grouping.

Certain embodiments disclosed herein include a method, non-transitory computer-readable medium, or system as noted above or below, wherein the plurality of clusters is created based on features distances between first cybersecurity alerts among the plurality of first cybersecurity alerts.

Certain embodiments disclosed herein include a method, non-transitory computer-readable medium, or system as noted above or below, further including or being configured to perform the following step or steps: determining a plurality of features vector for the plurality of first cybersecurity alerts; and determining a plurality of features vector a plurality of centers of the plurality of clusters, wherein the at least one first cybersecurity alert is selected from each of the plurality of clusters based on a plurality of distances, wherein each distance is between a features vector for one of the plurality of first cybersecurity alerts and a features vector for one of the centers of one of the clusters among the plurality of clusters to which the first cybersecurity alert belongs.

Certain embodiments disclosed herein include a method, non-transitory computer-readable medium, or system as noted above or below, wherein the prioritization machine learning model is trained such that weights of the prioritization model are exposed.

Certain embodiments disclosed herein include a method, non-transitory computer-readable medium, or system as noted above or below, wherein the prioritization machine learning model is further trained based on a first set of locations of root causes of the plurality of first cybersecurity alerts, wherein the prioritization machine learning model is applied to features including a second set of locations of root causes of the plurality of second cybersecurity alerts.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
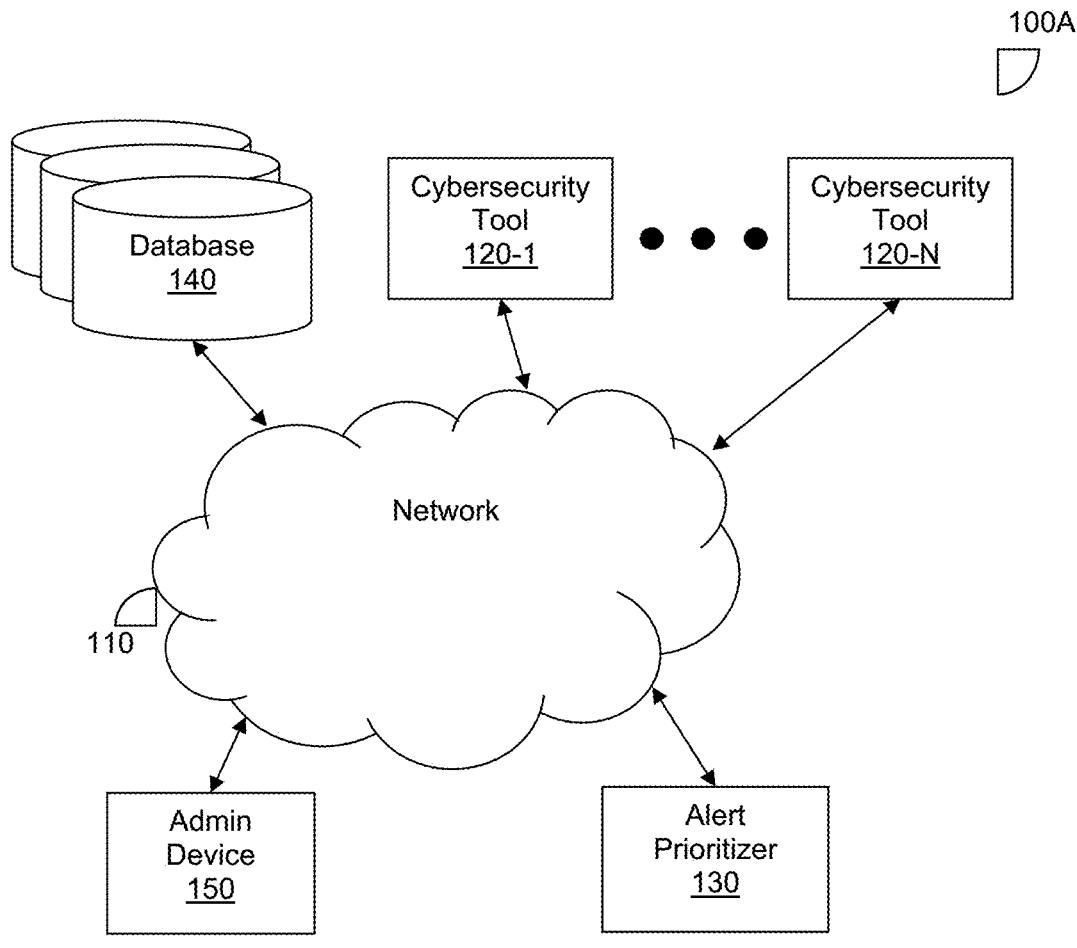
FIGS. 1A-B are network diagrams utilized to describe various disclosed embodiments.

In light of the use of various cybersecurity tools noted above, it has been identified that prioritizing alerts across different sources (e.g., different cybersecurity tools) presents a challenge. More specifically, alerts from different sources may not express urgency in the same manner, and the different sources may determine severities differently. For example, a high severity alert from one source and a high severity alert from another source may not actually represent the same degree of threat. Accordingly, it has been further identified that alerts from different sources cannot be compared directly, and that alerts from different sources cannot be accurately prioritized based on direct comparisons of the explicit information in those alerts. To this end, various disclosed embodiments provide techniques for cross-source alert prioritization that allow for effectively comparing alerts from different sources in order to determine which of those alerts to prioritize over others.

The various disclosed embodiments include methods and systems for prioritizing alerts and for automating remediation using such prioritizations. In particular, various disclosed embodiments may be utilized to prioritize alerts from different sources (e.g., alerts generated by different cybersecurity tools) in order to provide a cross-source prioritization which may be utilized to more effectively prioritize alerts in spite of any differences in formatting, severity criteria, and other factors which render direct comparisons between alerts from such different sources ineffective. To this end, various disclosed embodiments leverage machine learning techniques in order to learn prioritization tendencies which may be utilized to automate prioritization in a more context-rich manner than existing automated solutions without requiring a user to explicitly define a prioritization procedure.

In various embodiments, alerts from cybersecurity tools are ingested and prioritized by an alert prioritizer system. The alert prioritizer system includes or is otherwise configured to utilize a prioritization model. In accordance with various disclosed embodiments, the prioritization model is a machine learning model trained based on training data including features of historical alerts and prioritization data for those alerts. The prioritized alerts may be utilized to automatically remediate alerts or otherwise may be presented to a user (e.g., a security systems administrator via an admin device operated by such an administrator) to assist in remediation efforts.

In this regard, it is noted that remediation is typically an expensive process in terms of resources, whether computer resources or human resources. Optimizing prioritization using the various techniques described herein may aid in reducing or otherwise optimizing use of resources, particularly computing resources, in order to more efficiently remediate potential cyber threats. Additionally, correctly prioritizing alerts allows for mitigating potential cyber threats faster than if alerts are not correctly prioritized.

In an embodiment, the prioritization model is trained using a machine learning algorithm, such as, but not limited to, a genetic algorithm or simulated annealing algorithm. In some embodiments, the prioritization model is trained using a labeled training set including pairs of alerts labeled with prioritization results indicating which alert of the pair is higher priority than the other alert of the pair. The prioritization model may optionally be tuned, for example based on inputs provided by a user, in order to account for subsequent developments or otherwise based on additional prioritization considerations which may not be explicitly captured in the prioritization model.

When the prioritization model is trained, new alerts are ingested and the model is applied to features extracted from the new alerts. Based on the outputs of the model when applied in this manner, an alert priority is determined. In some embodiments, the alert priority may be further determined based on efficiency of remediation actions, for example, by further prioritizing remediation actions which will remediate multiple threats such that the cumulative threat reduction is further improved as compared to the initial priority. The alert priority may be utilized to generate an output for display, to prioritize automated remediation actions, or both.

To aid in training the prioritization model more efficiently, various disclosed embodiments include techniques for clustering which may be utilized to reduce the amount of alerts to be presented for obtaining prioritization inputs. More specifically, the clustering techniques may be utilized to reduce the sample size of alerts presented to a user in order to obtain prioritization inputs while ensuring that the sampled alerts accurately represent the broader data set. To this end, alerts are clustered based on features distances, and alerts are sampled from each cluster based on proximity to the center of the cluster. In some implementations, clustering as described herein may reduce the number of potential alerts to be used for obtaining prioritization data from millions of alerts to less than 100. Further, groupings of alerts may be selected from different clusters such that each alert in the grouping is selected from a different cluster in order to further improve the efficiency of obtaining prioritization data by avoiding presenting alerts from the same cluster to obtain prioritization inputs.

In this regard, it is noted that alerts within the same cluster as described herein tend to be prioritized similarly, that is, alerts in the same cluster tend to be given the same priority relative to alerts in other clusters. Accordingly, clustering alerts before obtaining prioritization inputs allows for selecting representative alerts from each cluster and comparing only the representative alerts rather than all of the alerts in each cluster. That is, prioritization may effectively be performed between clusters by comparing only representative alerts between the clusters. Prioritizations between clusters may then be enforced on other alerts within a cluster such that each of the alerts in a first cluster, whose representative alerts were determined to be higher priority than representative alerts of a second cluster, may be assigned higher priority as compared to each alert in the second cluster without needing to compare each alert in the first cluster to each alert in the second cluster.

Additionally, various disclosed embodiments further provide techniques for determining normalized alert severities. The normalized alert severities provide severity data for alerts in a unified format with standardized severity values, thereby allowing for effectively comparing severities between different data sources. In some embodiments, the normalization may utilize a severity normalization model to determine a normalized severity for each alert. Such a severity normalization model may further be a machine learning model trained based on features extracted from historical alerts. Such features may include, but are not limited to, training alert severities and other training features for aspects of the underlying threats represented by the alerts, and may further include features related to the tools which generated the historical alerts such as frequency of different severity values or user feedback (e.g., user inputs indicating whether a given user agrees or disagrees with the severity).

In this regard, it is noted that there is no uniform standard for alerting on severity of threats, and that different providers may assign more or less weight to different factors which affect how severe a threat is. As a non-limiting example, the same issue may be alerted by one provider's tool as being "high" severity, and another provider's tool as being "critical" severity. Normalizing the format and values of severity therefore allows for effectively and more accurately prioritizing alerts from such different sources.

The disclosed embodiments leverage machine learning in order to automate remediation of alerts in a manner which does not require an explicit prioritization procedure from the user. Moreover, the prioritization may be customized to a given user, i.e., to emulate the prioritizations which that user would make. However, the disclosed techniques allow for emulating the user's prioritizations in a more objective manner than decisions which would be taken by the user themselves, and therefore are less influenced by external factors which might affect the user's objectivity.

The priorities determined in accordance with the disclosed embodiments may therefore be more accurate than naïve priorities based purely on raw incoming severity information indicated in alerts and more consistent than subjective judgments about prioritization which may be performed by manual operators. Accordingly, remedial actions performed based on priorities determined as described herein allow for more effectively securing computing infrastructures against potential cyber threats, thereby improving cybersecurity of systems and data among those computing infrastructures.

Further, the prioritization model created in accordance with various disclosed embodiments may allow for further explicit customization by the user post training. To this end, some embodiments may utilize a limited feature set for the machine learning model, for example, a number of features less than 10. Such a limited number of features may improve visibility to the user and facilitate user interactions in customizing the model, for example, to customize the model based on updates in prioritization approaches. Further, in some implementations, the prioritization model may avoid using neural network techniques in order to provide a user visibility by avoiding any hidden layers, thereby further facilitating user customization of the model.

It is also noted that prioritization procedures used by a given user may vary by organization, and may or may not be explicitly documented. Moreover, even if those procedures are documented, they must be translated into a set of rules which explicitly define the decisions used for prioritization (e.g., in the form of an explicitly defined decision tree). Various disclosed embodiments utilize machine learning prioritization models defined with respect to sets of features which can be observed across alerts in order to model user prioritization decisions without requiring explicit programming or otherwise providing of prioritization procedures and processes.

Figure 1B:
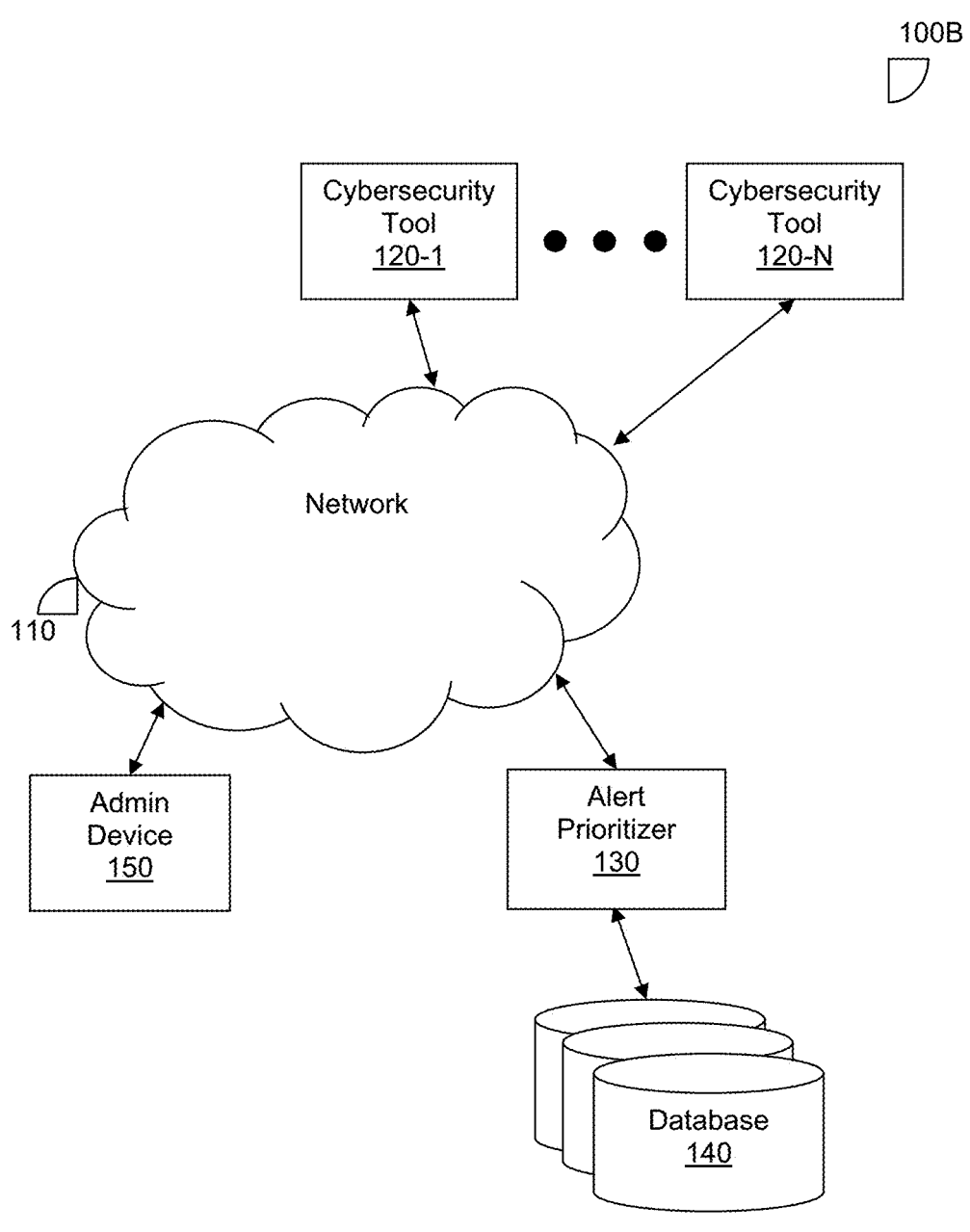

FIGS. 1A-B are network diagrams 100A and 100B, respectively, utilized to describe various disclosed embodiments.

FIG. 1A shows an example network diagram 100A utilized to describe the various disclosed embodiments. In the example network diagram 100A, a plurality of cybersecurity tools 120-1 through 120-N (hereinafter referred to individually as a cybersecurity tool 120 and collectively as cybersecurity tools 120, merely for simplicity purposes), an alert prioritizer 130, databases 140, and an administrator (admin) device 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the cybersecurity tools 120 acts as a source of alerts to be addressed in a computing environment (not shown). To this end, the cybersecurity tools 120 may be configured to perform activities such as, but not limited to, monitoring, collecting data, analyzing, generating alerts, transmitting alerts, and the like. Moreover, in accordance with various disclosed embodiments, the cybersecurity tools 120 may generate alerts in different formats, with different criteria for urgency, or otherwise expressing the same base information in different ways such that the alerts cannot be effectively prioritized via directly comparing data contained therein. As a non-limiting example, alerts indicating a medium urgency from cybersecurity tool 120-1 may, on average, present a higher degree of threat than alerts indicating a high urgency from cybersecurity tool 120-2 such that comparing the urgencies as explicitly indicated in alerts from those cybersecurity tools 120-1 and 120-2 would yield inaccurately prioritizing the alerts.

The alert prioritizer 130 is configured to prioritize alerts as described herein, including but not limited to, prioritizing alerts from different sources (e.g., different cybersecurity tools 120). To this end, the alert prioritizer 130 is configured to train and utilize prioritization models trained using training data including alerts (e.g., alerts from the cybersecurity tools 120 or stored in the databases 140). The training data may further include training prioritization data to be utilized for labeling training inputs for supervised machine learning, for example, labels indicating which alerts are higher priority than others (e.g., labeling each alert in a pair as either higher or lower priority relative to the other alert). Such training prioritization data may be obtained from the admin device 150 or from the databases 140.

As discussed herein, the training prioritization data may be obtained using clustering in order to minimize the number of alerts to be utilized for obtaining the training prioritization data. As a non-limiting example, when obtaining the training prioritization data includes presenting pairs of alerts to a user of the admin device 150 and requesting user inputs indicating which alert is higher than the other, the alerts among potential training alerts may be clustered and the alerts to be presented to the user of the admin device 150 are selected from among those potential training alerts based on the clusters. This reduces the amount of interactions needed in order to obtain an effective training set, thereby conserving computing resources as well as reducing the amount of manual work needed in order to obtain a labeled training set for supervised learning.

The databases 140 may contain, but are not limited to, data to be used for training as described herein. For example, as noted above, the databases 140 may store training alerts, training prioritization data, both, and the like, to be used for training the prioritization model.

The admin device 150 is operated or otherwise used by an administrator or other user for securing a computing infrastructure (not shown) based on alerts from the cybersecurity tools 120. To this end, the admin device 150 may be configured to receive and display graphical interfaces illustrating prioritized alerts determined, for example, by the alert prioritizer 130 as described herein.

In some implementations, the admin device 150 may be utilized for creating training data to be utilized for training the prioritization model as described herein. To this end, in such implementations, the alert prioritizer 130 may send groupings of alerts (e.g., pairs of alerts) to be displayed to a user of the admin device 150, and the admin device 150 may receive user inputs indicating which alerts are higher priority than other alerts in the same groupings. These user inputs may be utilized to generate training prioritization data to be used for labeling, for example, by labeling each grouping of alerts with the respective user inputs indicating the prioritization or otherwise labeling each grouping of alerts based on the user inputs received in response to displaying the alerts.

FIG. 1B shows an example network diagram 100B illustrating another deployment in accordance with various disclosed embodiments. More specifically, the network diagram 100B illustrates an offline deployment in which the alert prioritizer 130 communicates with the databases 140 directly rather than via the Internet or other networks (e.g., the network 110). Such an offline deployment may allow for training machine learning models using data stored in the databases 140 offline, i.e., without accessing the Internet, which may be relevant for various implementations for further securing data used for training and alert prioritization. To this end, in such an implementation, the databases 140 may contain historical alerts to be used for training.

Figure 2:
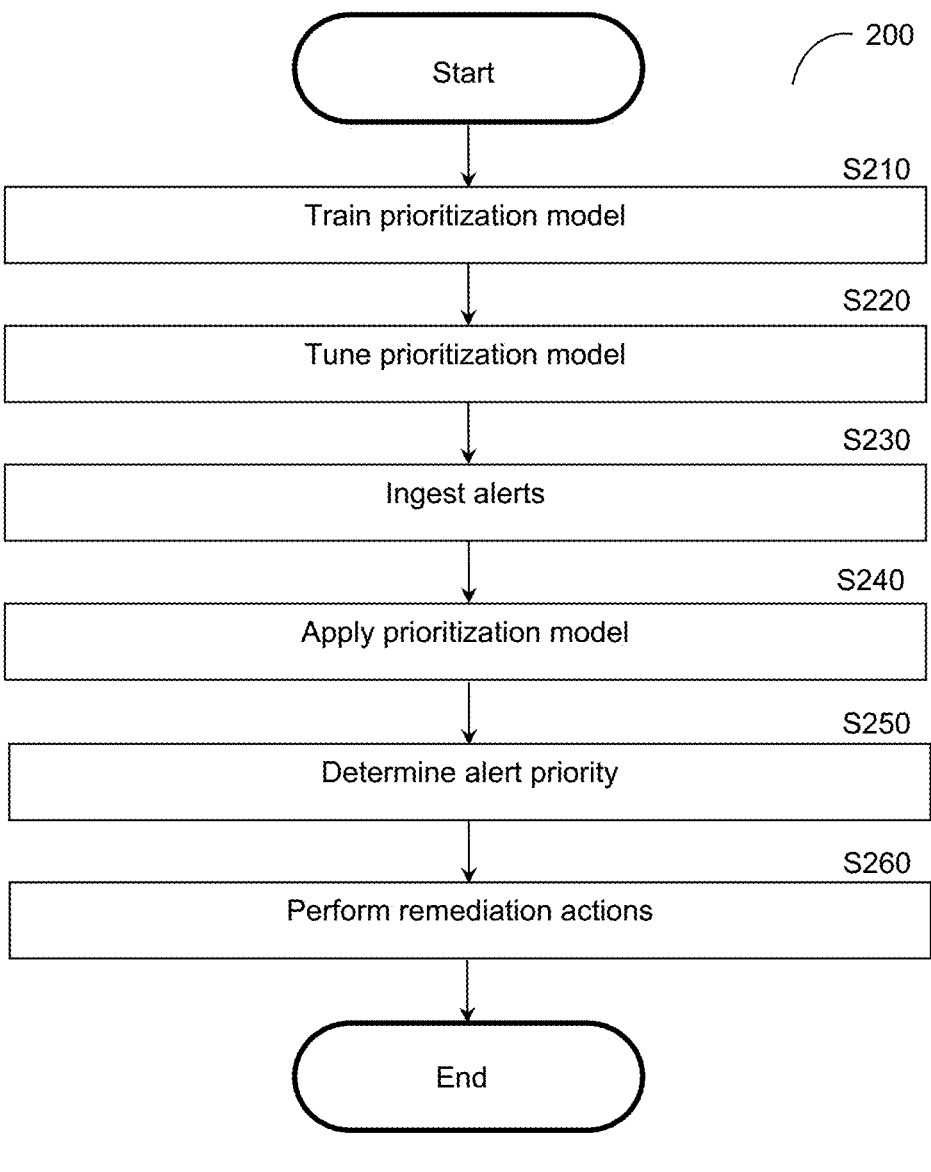
FIG. 2 is a flowchart illustrating a method for alert prioritization and remediation according to an embodiment.

FIG. 2 is a flowchart 200 illustrating a method for alert prioritization and remediation according to an embodiment. In an embodiment, the method is performed by the alert prioritizer 130, FIG. 1.

At S210, a prioritization model is trained. The prioritization model is a machine learning model trained using training data including training alerts and training prioritization data, where the prioritization data indicates priorities of alerts (e.g., priorities of alerts relative to other alerts among the training alerts). The training alerts are a first set of alerts to be used for training. In an embodiment, the prioritization model is trained as described further below with respect to FIG. 3.

As noted above, in some embodiments, the prioritization model may be customized to a particular user or group of users, for example, a particular administrator of a computing environment, a particular business unit, a particular tenant (e.g., users who are employees of an organization), combinations thereof, and the like. In this regard, the prioritization model may be trained using training prioritization data created based on feedback from that user or groupings of user. As a non-limiting example, the training prioritization data may be created based on selections of higher priority alerts among groupings of alerts presented to the user. By using only training prioritization data generated based on inputs made by a given user, the prioritization model may be customized to that user, i.e., such that the prioritization model effectively mimics prioritization decisions which would be made by that user.

The training prioritization data may be created based on explicit selections made by users or groups of users, based on inferred selections determined based on actions with respect to historical alerts, both, and the like. As another non-limiting example, inferred selections may be determined based on the order in which historical alerts were interacted with in a findings table, which historical alerts were addressed by a user (as opposed to historical alerts which were not ultimately addressed or otherwise skipped), and the like.

In some embodiments, the prioritization model is trained using further features including actionability features, where the actionability features relate to a degree of actionability for a given alert. Such a degree of actionability may be determined using predetermined actionability determination rules, which may be defined based on root causes of alerts identified via root cause analysis. A non-limiting example root cause analysis process which may be utilized for this purpose is described further in U.S. patent application Ser. No. 17/507,180, assigned to the common assignee, the contents of which are hereby incorporated by reference.

In a further embodiment, the actionability features are defined with respect to control of the root cause or otherwise location of the root cause. For example, a root cause which is controlled by an organization who will be performing remediation or otherwise located in a computing environment of that organization may be more actionable than a root cause which is controlled or otherwise located outside of the computing environment of that organization (e.g., in a third party's computing environment), and that actionability may be learned based on training actionability features including the controlling entity or location of the root causes for different alerts.

As a non-limiting example for actionability of an alert related to a vulnerability in a software container, when a root cause of the alert is determined to be in a base image of the software container and the base image is provided by a source outside of a computing environment of an organization which would remediate the alert, then the alert may be less actionable than an alert having a root cause inside of the organization or may not be actionable at all (i.e., since a user within the organization cannot control the base image). Training examples in which an alert had a root cause controlled or located in a certain computing environment may therefore be learned, via machine learning training, to be less actionable than alerts having root causes controlled or located in other computing environments.

At optional S220, the prioritization model may be tuned. The tuning may include, but is not limited to, adjusting weights of the trained prioritization model. As a non-limiting example, the tuning may be performed based on user inputs such as, but not limited to, inputs from an admin viewing the weights of the model. To this end, in some embodiments, the machine learning techniques used to train the prioritization model include using one or more machine learning algorithms which allow for exposing the weights. For example, in an example implementation, use of a neural network (which typically includes nodes with hidden weights) may be avoided in order to ensure that all weights can be exposed, thereby allowing for manual tuning of the trained model.

At S230, alerts are ingested from one or more cybersecurity tools (e.g., the cybersecurity tools 120, FIGS. 1A-B). The alerts are a second set of alerts which may indicate or otherwise relate to potential cyber threats in a computing environment such that prioritizing the alerts will allow for more effectively securing the computing environment against cybersecurity threats. More specifically, prioritizing the alerts allows for optimizing use of resources to remediate potential cybersecurity threats, thereby reducing risk in computing environments.

At S240, the trained prioritization model is applied with respect to the alerts. More specifically the prioritization model may be applied to the alerts, or to features extracted from the alerts. To this end, in some embodiments, S240 further includes extracting such features from the alerts. The prioritization model provides outputs such as, but not limited to, outputs indicating a priority of the alerts.

At S250, an alert priority is determined for the alerts based on the outputs of the prioritization model. The priority may be or may include, but is not limited to, an ordered list of alerts from highest to lowest priority.

When certain alerts have the same priority, the determined priority may either indicate as such (i.e., that the alerts are the same priority), or predetermined tiebreaking rules may be applied to determine which of the tied alerts (i.e., alerts having the same priority) should be ranked higher in priority. As a non-limiting example, such tiebreaking rules may prioritize alerts related to activity by a particular user who has higher level privileges since potential harm of successful cyber attacks for those alerts would likely cause more damage.

In some embodiments, the alert priority may be further determined based on efficiency of remediation actions. As a non-limiting example, the alert priority may be determined so as to prioritize remediation actions which will remediate multiple threats such that the cumulative threat reduction is further improved as compared to the initial priority. As a further example, when alerts are within a threshold distance of each other in the ordered list of priority (e.g., alerts are within two places of each other) and it is determined that remediating the lower priority alert will remediate multiple other alerts, then the lower priority alert may be prioritized over the higher priority alert in order to provide an overall more efficient remediation of potential cyber threats within the computing environment.

As noted above, in a further embodiment, the prioritization model may be further trained based on actionability features such as, but not limited to, features indicating control over or location of a root cause of each alert. In such an embodiment, the prioritization model is further applied to application actionability features for the alerts to be prioritized. To this end, in a further embodiment, S250 also includes performing root cause analysis in order to determine a root cause of each alert, and determining actionability features (e.g., control, location, etc.) for the root cause of each alert. The prioritization model may then be applied to the determined actionability features. The resulting priority would, in such an embodiment, also account for actionability such that alerts which are more actionable are prioritized over otherwise comparable alerts which are less actionable.

At S260, one or more remediation actions may be performed based on the determined priority. More specifically, remediation actions are performed so as to prioritize remediating higher priority alerts over lower priority alerts. As a non-limiting example, some alerts which are higher priority may be remediated prior to remediating lower priority alerts. As another non-limiting example, only some of the alerts may be remediated, and the determined priority may be utilized to select which alerts to be remediated. As yet another non-limiting example, prioritization suggestions may be generated and presented to a user so that the user may make prioritization decisions based on the suggestions presented based on the determined priority.

The remediation actions may include, but are not limited to, generating and sending a notification, performing mitigation actions such as changing configurations of software components, changing code of software components, blocking traffic, reconfiguring network components, combinations thereof, and the like. The notification may include, but is not limited to, an ordered list of alerts based on the priority such that the ordered list of alerts may be displayed or otherwise output to a user for use in prioritizing manual remediation actions. The remediation actions to be performed may be determined using one or more predefined remediation rules, which may further be defined with respect to types of issues indicated in the alerts (e.g., issues related to potential cyber threats), locations for which alerts were generated (e.g., locations defined with respect to a computing infrastructure), both, and the like.

The prioritization of remediation may further be performed based on resources or otherwise based on available capabilities. As a non-limiting example, when remediating an alert includes using remediation actions of a certain cybersecurity tool such that the cybersecurity tool must complete performing remediation actions for one alert before it can proceed to perform remediation actions for another alert, the remediation actions may be performed for respective alerts in order from higher to lower priority. In such embodiments, remediation actions for some lower priority alerts may be performed prior to some higher priority alerts based on availability or capability, that is, if it is possible to remediate the lower priority alerts in parallel with the higher priority alerts but it is not possible to remediate all of the higher priority alerts in parallel, certain lower priority alerts may be remediated earlier than expected according to the ordered list of prioritized alerts. In other words, capabilities for remediation may be leveraged to optimize remediation of as many alerts in parallel as possible regardless of whether some of the lower priority alerts are remediated earlier than they "should" be according to the priority.

Figure 3:
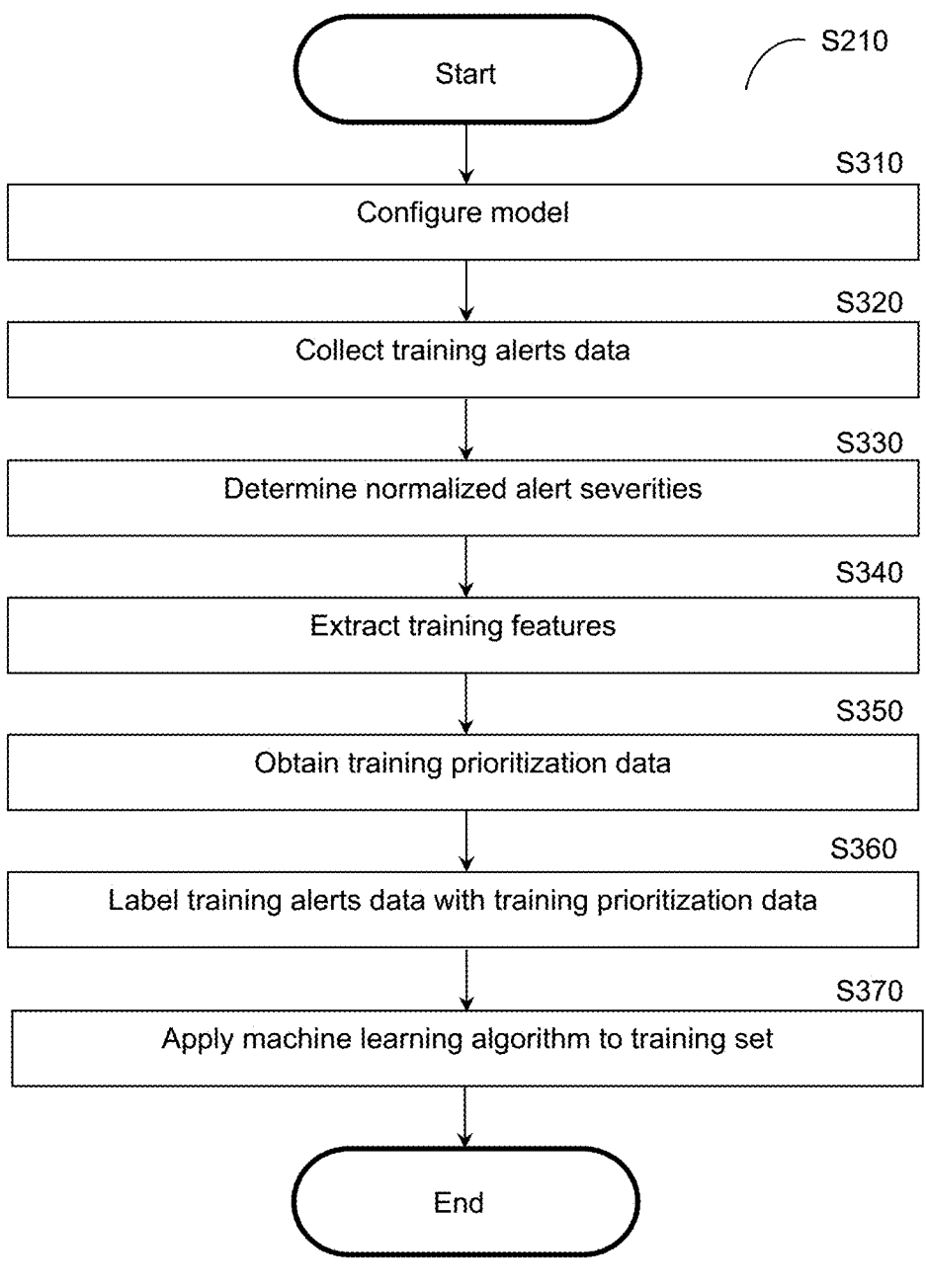
FIG. 3 is a flowchart illustrating a method for training a prioritization model according to an embodiment.

FIG. 3 is a flowchart S210 illustrating a method for training a prioritization model according to an embodiment.

At S310, the prioritization model is configured. In an embodiment, the configuration is a default configuration which depends on the use case. The configuration may include, but is not limited to, setting initial weights (e.g., to predetermined values), configuring hyperparameters (e.g., based on a predetermined hyperparameter configuration), both, and the like.

At S320, training alerts data is collected. The training alerts data includes training alerts from cybersecurity tools (e.g., the cybersecurity tools 120, FIGS. 1A-B). The alerts may indicate, for example, a type of alert (e.g., as defined with respect to an alert identifier), a type of threat which the alert may indicate, a criticality (e.g., a severity such as "high," "low," "medium," "critical," etc.), events which triggered the alert or other data based on which the alert was generated, a time of the alert, combinations thereof, and the like.

At S330, normalized alert severities are determined for the training alerts. As noted above, different cybersecurity tools may express severity in different ways and/or may determined severities using different criteria (i.e., such that the same severity as reported by different tools may not actually represent the same degree of threat). Normalizing the alert severities may help to provide a more accurate reflection of degrees of severity, for example when presenting alerts to users for prioritization when obtaining training prioritization data as discussed below. This, in turn, may reduce bias which might be caused by a user viewing one alert indicating that it is "critical" and another alert indicating that it is "high" when both alerts are actually comparable severity.

In some embodiments, the normalized alert severities may be determined based on predetermined tendencies known for certain cybersecurity tools (e.g., that "critical" alerts from a particular tool tend to be ultimately considered "high" severity instead), vulnerability-specific context (e.g., by further ranking potential vulnerabilities which may trigger alerts as higher priority than others), both, and the like.

In an embodiment, S330 may further include applying one or more machine learning models trained based on historical alerts data to the training alerts in order to determine the normalized alert severities. In an example implementation, such a machine learning model may be trained using supervised machine learning based on a training set including training alerts and training normalized severity labels for respective training alerts. In this regard, such a model may effectively represent learned patterns in overestimating or underestimating severity. As a non-limiting example, when severity alerts from a given cybersecurity tool are consistently overestimated (i.e., the alerts indicate "critical" severity when the normalized severity labels indicate that those alerts were actually only "high" severity), then the normalization machine learning model trained based on that training set may output lower severity normalized alerts for alerts generated by that tool.

At S340, training features are extracted from the training alerts. In an embodiment, the training features include, but are not limited to, types of alerts, severities (e.g., as explicitly indicated by the alerts), both, and the like. The training features may be values representing respective parameters which might relate to alert priorities.

At S350, training prioritization data is obtained for at least a portion of the training alerts. In an embodiment, the training prioritization data is, includes, or is determined based on prioritization inputs provided in response to certain groupings of alerts. As a non-limiting example, alerts may be grouped into pairs, and the training prioritization data may include prioritization inputs indicating which alert in each pair is higher priority than the other. The training prioritization data may be utilized to label the alerts as described herein in order to perform supervised learning.

It is noted that, in various embodiments, the training prioritization data is not derived solely from analyzing the explicit contents of the alerts. For example, the training prioritization data may be derived from inputs received via a user of a device (e.g., the admin device 150) in response to presentation of alert groupings. As a result, the prioritization data utilized to train the prioritization model is at least not solely based on the data of the alerts themselves. As noted above, alerts from different cybersecurity tools may indicate severities or other priority-related information using different criteria such that the same or similar severities indicated in alerts from different cybersecurity tools may not accurately reflect the priorities of alerts relative to each other. Thus, obtaining prioritization inputs as described herein and using those prioritization inputs to create the training prioritization data allows for effectively and accurately comparing severities or otherwise prioritizing alerts from different cybersecurity tools, without necessarily requiring explicit data about prioritization of the cybersecurity tools themselves.

To aid in obtaining the prioritization inputs which allow for prioritizing alerts across different sources (e.g., different cybersecurity tools), obtaining the training prioritization data may further include presenting a reduced set of alerts including samples selected from among a broader data set. To this end, in an embodiment, the training prioritization data for the alerts is obtained at least partially as described further below with respect to FIG. 4. Specifically, in such embodiments, S350 may further include clustering the alerts into multiple clusters and selecting one or more representative alerts from each cluster for presentation in order to obtain prioritization inputs to be used for creating the training prioritization data.

In a further embodiment, representative alerts selected from each cluster are grouped (e.g., into pairs) into groupings containing representative alerts from different clusters such that, when the groupings are presented to a user, the user's selections are effectively selections between clusters, i.e., a user selecting one alert as higher priority over another also demonstrates that other alerts in the cluster of the higher priority alert are likely higher priority than alerts of clusters of lower priority alerts in the same grouping.

In this regard, it is noted that obtaining the training prioritization data is a technical challenge. That is, providing a smaller data set that is capable of being labeled in a time-effective manner while ensuring that the smaller data set still accurately represents the whole data set poses a technical challenge. The disclosed clustering provides a technique for overcoming this technical challenge in order to efficiently provide accurate training prioritization data. Moreover, such use of clustering reduces computing resources needed to transmit and display larger amounts of training alerts as well as improves user interactions via a streamlined input process.

In some embodiments, S350 further includes inferring at least some of the training prioritization data based on historical data related to viewing, remediating, or otherwise responding to alerts. Such inference may be utilized in order to obtain more training data while minimizing user inputs and bias. To this end, the inference may be based on factors such as, but not limited to, time spent viewing alerts, time to respond to alerts, whether remediation actions were performed in response to alerts, combinations thereof, and the like. Such historical data may be, for example but not limited to, log data.

The inferred training prioritization data may be used to supplement the explicitly provide training prioritization data in order to reduce the amount of data which must be explicitly provided. As a non-limiting example, rules applied in order to make such inferences may be defined so as to automatically infer priorities of alerts meeting certain thresholds in order to determine priorities for alerts which are clearly high priority without requiring presenting those alerts to a user, and alerts which are closer calls (e.g., not meeting one or more of such thresholds) may be presented to the user, thereby only presenting alerts which require finer differentiation for manual labeling.

As a non-limiting example for inferring priorities, S350 may include querying data related to viewing of a findings table in order to identify events in which a user viewed the findings table for over 15 seconds, where those events where the user stayed in the findings table over a threshold period of time are determined to be related to higher priority alerts (i.e., because a user viewed findings data for that event for a relatively long period of time). Consequently, alerts which were generated within a certain time period before that event may be inferred to be high priority.

At optional S360, at least some of the training alerts are labeled using data among the training prioritization data. In an embodiment, alerts in each grouping are labeled with relative priorities as compared to other alerts in the grouping, for example as indicated by the training prioritization data.

As a non-limiting example, when alerts are grouped into pairs, a first alert in the pair is labeled as "higher priority" and a second alert in the pair is labeled as "lower priority." As another non-limiting example, when alerts are grouped into groupings of three, a first alert in the pair is labeled as "highest priority," a second alert in the pair is labeled as "middle priority," and a third alert in the pair is labeled as "lowest priority."

At S370, one or more machine learning algorithms are applied to a training set including at least a portion of the training alerts and the training prioritization data. Such machine learning algorithms may be or may include, but are not limited to, a genetic algorithm or simulated annealing algorithm. The result of applying the machine learning algorithms is a prioritization model trained to prioritize subsequent alerts using those subsequent alerts as inputs.

Figure 4:
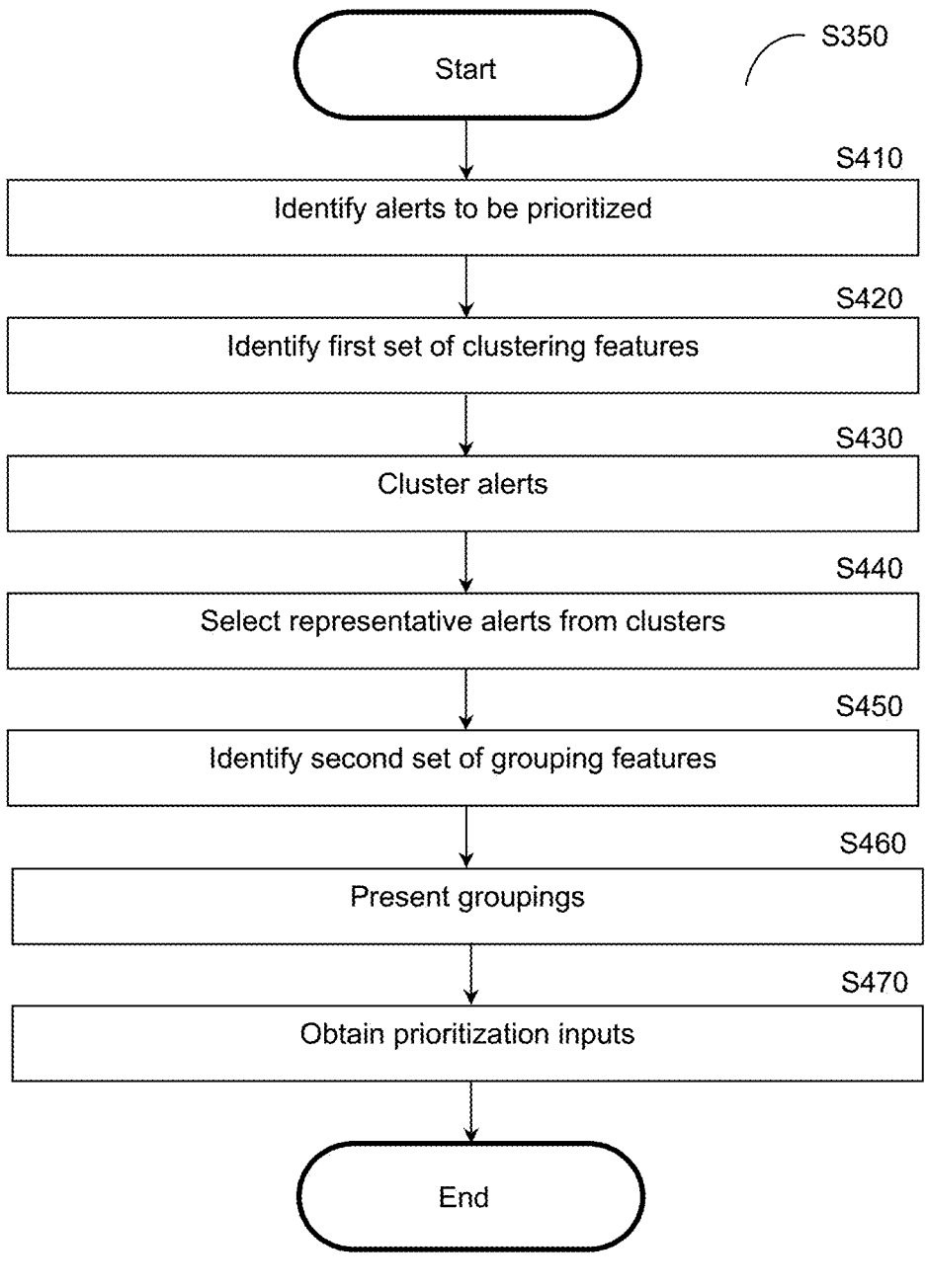
FIG. 4 is a flowchart illustrating a method for obtaining prioritization data for alerts according to an embodiment.

FIG. 4 is a flowchart S350 illustrating a method for obtaining prioritization data for alerts according to an embodiment.

At S410, alerts to be prioritized are identified. In an embodiment, the alerts identified at S410 include alerts among training alerts data, for example, the data collected as described with respect to S320, FIG. 3.

At S420, a first set of clustering features to be used for clustering the alerts is extracted from the alerts. The clustering features may include, but are not limited to, types of alerts, criticalities of alerts (e.g., as expressed with respect to severities, criticalities, priorities, or other information in the alerts indicating a degree of urgency for each alert), both, and the like. In an embodiment, S420 may include parsing the alerts and performing natural language process on text in the alerts in order to analyze the alerts for such clustering features.

At S430, the alerts are clustered based on the clustering features. In an embodiment, S430 includes applying one or more clustering algorithms based on the clustering features. In a further embodiment, the clustering may be based on features distances between alerts, i.e., such that alerts having smaller features distances from each other (e.g., below a predetermined threshold) are clustered into the same cluster. To this end, in some embodiments, each alert is represented by a clustering features vector created using the clustering features of that alert, and S430 may include calculating distances between alerts among the alerts to be prioritized based on their respective clustering features vectors.

In an embodiment, the clusters are defined such that alerts within each cluster have minimal distances from each other (e.g., below a predetermined threshold) while alerts in different clusters have maximal distance from each other (e.g., above a predetermined threshold). In this regard, it is noted that clusters which are better for training in at least some implementations demonstrate high features similarity within the same cluster while maximizing the distance with sets of features from different clusters. These criteria provide sharper distinctions between clusters when selecting alerts for presentation, thereby allowing for reducing the number of samples to be selected while ensuring that the samples effectively represent the broader data set.

At S440, representative alerts are selected from among the clusters. In an embodiment, the representative alerts include alerts which are closest to a center of each cluster or otherwise which are within a threshold distance of a cluster center.

To this end, cluster centers may be defined, for example, as a features vector including mean, median, or other values which represent common feature values among alerts the cluster. In such embodiments, distance from the cluster center may be determined by calculating a features distance between the features vector of the cluster center and the features vector of a given alert (e.g., the clustering features vector for the alert as discussed above).

At S450, a second set of grouping features is extracted from among the data including the alerts and, specifically, from data of the representative alerts. The grouping features may include, but are not limited to, features vectors for the alerts (e.g., features vectors of the clustering features as discussed above), a cluster to which each alert belongs to, both, and the like. The grouping features are used to determine groupings to be presented in order to obtain prioritization inputs. For example, the grouping features may be utilized to select groupings of alerts from different clusters.

At S460, the groupings are presented in order to prompt prioritization inputs. In an embodiment, the groupings may be sent to a device (e.g., the admin device 150, FIGS. 1A-B) operated or otherwise used by a user or users who will provide example prioritizations for the alerts in the groupings. The device, in turn, may accept user inputs made in response to displaying or otherwise presenting the groupings of the alerts.

At S470, prioritization inputs are obtained to be included in the training prioritization data. As noted above, the prioritization inputs may be received by a device presenting the groupings of alerts such that obtaining the prioritization inputs may be obtained by receiving the inputs from those devices.

Figure 5:
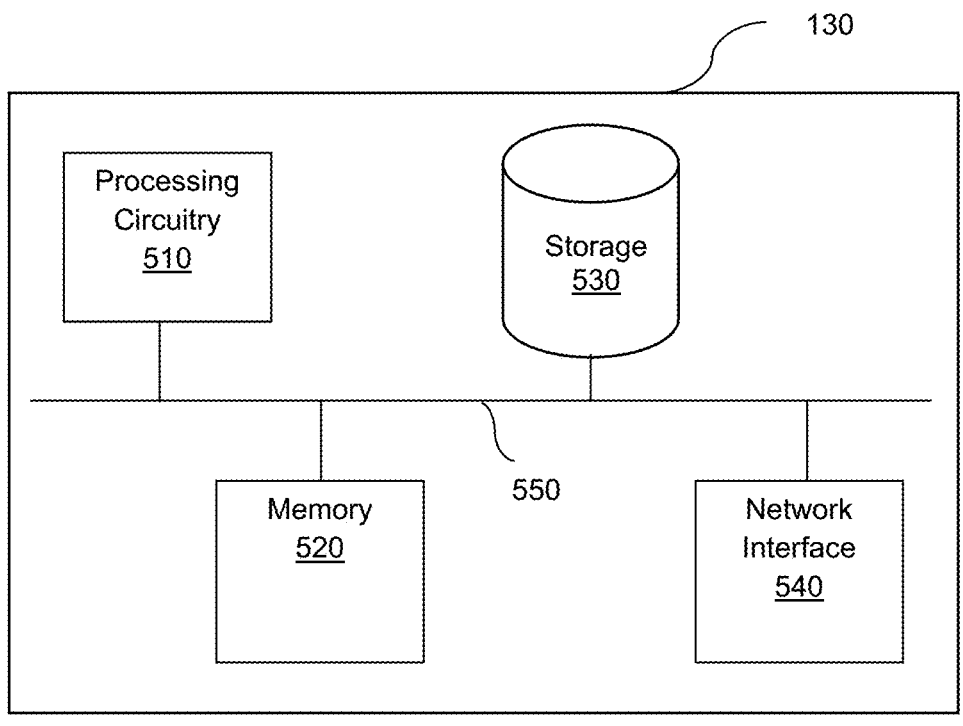
FIG. 5 is a schematic diagram of an alert prioritizer according to an embodiment.

FIG. 5 is an example schematic diagram of an alert prioritizer 130 according to an embodiment. The alert prioritizer 130 includes a processing circuitry 510 coupled to a memory 520, a storage 530, and a network interface 540. In an embodiment, the components of the alert prioritizer 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the alert prioritizer 130 to communicate with, for example, the cybersecurity tools 120, the databases 140, the admin device 150, and the like.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for alert prioritization, comprising:

clustering a plurality of cybersecurity alerts from a plurality of alert sources into a plurality of clusters, where each cybersecurity alert in the plurality of cybersecurity alerts has a first features vector, where the plurality of cybersecurity alerts are clustered based on features distances between cybersecurity alerts among the plurality of cybersecurity alerts;

determining a center for each cluster in the plurality of clusters, where the center is represented by a second features vector;

selecting a plurality of first cybersecurity alerts based on a distance, where the distance is between the first features vector for the cybersecurity alert and the second features vector for the center of the cluster containing the cybersecurity alert, where at least one first cybersecurity alert is from each cluster of the plurality of clusters;

obtaining training prioritizations for each first cybersecurity alerts in the plurality of cybersecurity alerts;

determining a plurality of features for each of the first cybersecurity alerts in the plurality of cybersecurity alerts;

creating a training set including the plurality of first cybersecurity alerts, the plurality of features and the plurality of training prioritizations;

training a prioritization machine learning model on the training set;

applying the prioritization machine learning model with respect to a plurality of second cybersecurity alerts from the plurality of alert sources;

determining a priority for the plurality of cybersecurity alerts based on outputs of the prioritization machine learning model; and performing a plurality of remediation actions based on the determined priority.

2. The method of claim 1, further comprising:

selecting a plurality of groupings based on the plurality of clusters;

presenting, via a user device, the plurality of grouping to a user; and creating the training prioritization data is based on user inputs received from the user device in response to the presented plurality of groupings.

3. A non-transitory computer readable medium having stored thereon instructions for causing a processing circuitry to execute a process, the process comprising: clustering a plurality of cybersecurity alerts from a plurality of alert sources into a plurality of clusters, where each cybersecurity alert in the plurality of cybersecurity alerts has a first features vector, where the plurality of cybersecurity alerts are clustered based on features distances between cybersecurity alerts among the plurality of cybersecurity alerts;

determining a center for each cluster in the plurality of clusters, where the center is represented by a second features vector;

selecting a plurality of first cybersecurity alerts based on a distance, where the distance is between the first features vector for the cybersecurity alert and the second features vector for the center of the cluster containing the cybersecurity alert, where at least one first cybersecurity alert is from each cluster of the plurality of clusters;

obtaining training prioritizations for each first cybersecurity alerts in the plurality of cybersecurity alerts;

determining a plurality of features for each of the first cybersecurity alerts in the plurality of cybersecurity alerts;

creating a training set including the plurality of first cybersecurity alerts, the plurality of features and the plurality of training prioritizations;

training a prioritization machine learning model on the training set;

applying the prioritization machine learning model with respect to a plurality of second cybersecurity alerts from the plurality of alert sources;

determining a priority for the plurality of cybersecurity alerts based on outputs of the prioritization machine learning model; and performing a plurality of remediation actions based on the determined priority.

4. A system for alert prioritization, comprising:

a processing circuitry; and a memory, the memory containing instructions that, when executed by the processing circuitry, configure the system to:

cluster a plurality of cybersecurity alerts from a plurality of alert sources into a plurality of clusters, where each cybersecurity alert in the plurality of cybersecurity alerts has a first features vector, where the plurality of cybersecurity alerts are clustered based on features distances between cybersecurity alerts among the plurality of cybersecurity alerts;

determine a center for each cluster in the plurality of clusters, where the center is represented by a second features vector;

select a plurality of first cybersecurity alerts based on a distance, where the distance is between the first features vector for the cybersecurity alert and the second features vector for the center of the cluster containing the cybersecurity alert, where at least one first cybersecurity alert is from each cluster of the plurality of clusters;

obtain training prioritizations for each first cybersecurity alerts in the plurality of cybersecurity alerts;

determine a plurality of features for each of the first cybersecurity alerts in the plurality of cybersecurity alerts;

create a training set including the plurality of first cybersecurity alerts, the plurality of features and the plurality of training prioritizations;

train a prioritization machine learning model on the training set;

apply the prioritization machine learning model with respect to a plurality of second cybersecurity alerts from the plurality of alert sources;

determine a priority for the plurality of cybersecurity alerts based on outputs of the prioritization machine learning model; and perform a plurality of remediation actions based on the determined priority.

5. The system of claim 4, wherein the system is further configured to:

select a plurality of groupings based on the plurality of clusters;

present, via a user device, the plurality of grouping to a user; and create the training prioritization data is based on user inputs received from the user device in response to the presented plurality of groupings.

6. The method of claim 1, further comprising:

determining a first set plurality of root causes for each of the first cybersecurity alerts.

7. The method of claim 6, further comprising:

determining a first set of locations of the first set plurality of root causes; and determining a first set plurality of actionability features for each of the first cybersecurity alerts based on the location of the first set of plurality of root causes.

8. The method of claim 1, further comprising:

obtaining a plurality of historical cybersecurity alerts, where each historical cybersecurity alert in the plurality of historical cybersecurity alerts have a first historical feature, where the first historical feature is based on a tool that generated the respective historical cybersecurity alert.

9. The method of claim 1, further comprising:

obtaining a plurality of historical cybersecurity alerts, where each historical cybersecurity alert in the plurality of historical cybersecurity alerts have a second historical feature, where the second historical feature is based on an underlying threat represented by the respective historical cybersecurity alert.

10. The method of claim 1, further comprising:

supplementing the training prioritization data with a first set of inferred training prioritization, where the first set of inferred training prioritization is based on historical data related to viewing to alerts; and supplementing the training prioritization data with a second set of inferred training prioritization, where the second set of inferred training prioritization is based on historical data related to remediating to alerts.

11. The method of claim 1, further comprising:

training a normalization severity model on a plurality of historical cybersecurity alerts;

generating, via the normalized severity model, a plurality of normalized severities using the plurality of first cybersecurity alerts as an input; and determining the plurality of features for each of the first cybersecurity alerts, where each feature in the plurality of features includes a first feature based on a normalized severity from the plurality of normalized severities.

12. The method of claim 1, further comprising:

presenting, via a user device, the plurality of first cybersecurity alerts to a user; and creating the training prioritization data is based on user inputs received from the user device in response to the presented plurality of first cybersecurity alerts.

13. The system of claim 4, wherein the system is further configured to:

determine a first set plurality of root causes for each of the first cybersecurity alerts.

14. The system of claim 13, wherein the system is further configured to:

determine a first set of locations of the first set plurality of root causes; and determine a first set plurality of actionability features for each of the first cybersecurity alerts based on the location of the first set of plurality of root causes.

15. The system of claim 4, wherein the system is further configured to:

obtain a plurality of historical cybersecurity alerts, where each historical cybersecurity alert in the plurality of historical cybersecurity alerts have a first historical feature, where the first historical feature is based on a tool that generated the respective historical cybersecurity alert.

16. The system of claim 4, wherein the system is further configured to:

obtain a plurality of historical cybersecurity alerts, where each historical cybersecurity alert in the plurality of historical cybersecurity alerts have a second historical feature, where the second historical feature is based on an underlying threat represented by the respective historical cybersecurity alert.

17. The system of claim 4, wherein the system is further configured to:

supplement the training prioritization data with a first set of inferred training prioritization, where the first set of inferred training prioritization is based on historical data related to viewing to alerts; and supplement the training prioritization data with a second set of inferred training prioritization, where the second set of inferred training prioritization is based on historical data related to remediating to alerts.

18. The system of claim 4, wherein the system is further configured to:

train a normalization severity model on a plurality of historical cybersecurity alerts;

generate, via the normalized severity model, a plurality of normalized severities using the plurality of first cybersecurity alerts as an input; and determine the plurality of features for each of the first cybersecurity alerts, where each feature in the plurality of features includes a first feature based on a normalized severity from the plurality of normalized severities.

* * * * *